United States Patent
Engström

(10) Patent No.: US 9,311,342 B1
(45) Date of Patent: Apr. 12, 2016

(54) TREE BASED IMAGE STORAGE SYSTEM

(71) Applicant: Sony Corporation, Tokyo (JP)

(72) Inventor: Jimmy Engström, Malmö (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/617,325

(22) Filed: Feb. 9, 2015

(51) Int. Cl.
*G06K 9/46* (2006.01)
*G06F 17/30* (2006.01)
*H04N 19/90* (2014.01)

(52) U.S. Cl.
CPC ...... *G06F 17/3028* (2013.01); *G06F 17/30259* (2013.01); *G06F 17/30268* (2013.01); *H04N 19/90* (2014.11)

(58) Field of Classification Search
USPC .......................................................... 382/236
See application file for complete search history.

(56) References Cited

U.S. PATENT DOCUMENTS

| | | | |
|---|---|---|---|
| 6,285,995 B1 * | 9/2001 | Abdel-Mottaleb et al. ... | 707/737 |
| 6,625,319 B1 | 9/2003 | Krishnamachari | |
| 2010/0310186 A1 * | 12/2010 | Liu et al. ...................... | 382/239 |
| 2010/0316290 A1 | 12/2010 | Jia | |
| 2011/0305399 A1 | 12/2011 | Zitnick et al. | |
| 2015/0052139 A1 * | 2/2015 | Cevahir et al. ................ | 707/737 |

FOREIGN PATENT DOCUMENTS

| | | |
|---|---|---|
| EP | 2 757 521 A1 | 7/2014 |
| WO | WO 99/67695 A2 | 12/1999 |
| WO | WO 2015/006894 A1 | 1/2015 |

OTHER PUBLICATIONS

International Search Report, Application No. PCT/IB2015/056003, Nov. 20, 2015.
Anenth et al., "Feature Extraction and Selection for Image Retrieval", *International Journal of Soft Computer*, 3(2):84-87, 2008.
International Search Report, Application No. PCT/IB2015/056001, Dec. 2, 2015.
Rubner et al., "The Earth Mover's Distance as a Metric for Image Retrieval", *International Journal of Comuter Vision*, vol. 40, No. 2, Jan. 2000, pp. 99-121.
Shi et al., "Feature-Based Image Set Compression", *2013 IEEE International Conference on Multimedia and Expo (ICME)*, San Jose, CA, Jul. 15-19, 2013, 6 pp.
Zheng et al., "A Novel Video Coding Scheme with Frequency-Domain-based Conditional Frame Replenishment Algorithm", *International Conference on Information, Communications and Signal Processing (ICICS '97)*, Singapore, Sep. 9-12, 1997, pp. 274-278.

* cited by examiner

*Primary Examiner* — Yon Couso
(74) *Attorney, Agent, or Firm* — Myers Bigel & Sibley, P.A.

(57) ABSTRACT

The present disclosure generally relates to methods and computer program products for storing images in a computer memory, and in particular to a method and computer program product for storing a plurality of JPEG encoded images in a tree data structure, wherein common parts of images in upper tree nodes are utilized for compressing images in lower parts of the tree.

15 Claims, 5 Drawing Sheets

TREE BASED IMAGE STORAGE SYSTEM

TECHNICAL FIELD

The present disclosure generally relates to methods and computer program products for storing images in a computer memory, and in particular to a method and computer program product for storing a plurality of JPEG encoded images in a tree data structure, wherein common parts of images in upper tree nodes are utilized for compressing images in lower parts of the tree.

TECHNICAL BACKGROUND

Large social network companies like Facebook gets a very high amount of images submitted each month. In 2013, Facebook received 350 Million photos from users each day, amounting to a total of 250 Billion photos, or 300 petabytes.

Moreover, wearable oameras (also known as life-logging cameras) are on the rise, and these devices generate a huge amount of images during an ordinary day, since they are always active.

This means that users are more and more likely to gather photos with similar content. Low cost of storage and mobile phone cameras being ubiquitous means that many users have an abundance of images stored but seldom retrieved. Even though the cost of storage has dropped over the years, the size (resolution) and amount of photos has increased at the same rate, still limiting the users. Considering life-logging scenarios, where users may store more than 1000 images each day, optimizing storage is of essence.

SUMMARY OF THE INVENTION

The present invention generally aims at eliminating or at least reducing the problems discussed above as well as other problems. This is accomplished with methods and software's in accordance with the appended independent claims.

According to a first aspect, the present invention is realized by a method for storing a plurality of JPEG encoded images in a tree data structure, comprising the steps of: for each JPEG encoded image, calculating one or more feature vectors, each representing the content of the JPEG encoded image, using the calculated one or more feature vectors for each JPEG encoded image for calculating distance measures between each JPEG encoded image of the plurality of JPEG encoded images, and ordering the plurality of JPEG encoded images in a tree data structure based on the calculated distance measures, wherein each JPEG encoded image of the plurality of JPEG encoded images corresponds to a node in the tree data structure, and wherein one JPEG encoded image of the plurality of JPEG encoded images corresponds to a root node in the tree data structure.

The method further comprises, for each node in the tree data structure not being the root node, encoding the corresponding JPEG encoded image by, for at least some of the DCT blocks in the JPEG encoded image, calculating DCT encoded differences to at least one image block in the JPEG encoded image corresponding to the parent of the node, and if at least one DCT encoded difference is less than a threshold difference, replacing the DCT block by data relating to the minimum DCT encoded difference among the DCT encoded differences.

Interesting points in the image can be extracted to provide feature descriptors, e.g. points, edges or objects in the image By the term "feature vector" should, in the context of present specification, be understood to define one or a combination of feature descriptors of the image. The feature vector may have any dimensionality. An example of a descriptor may be a histogram of the colors in the image, or a set of SIFT/SURF vectors.

By the term "distance measure" should, in the context of present specification, be understood to define how similar two images are when considering the content of the images. By using feature vectors for calculating such distance measure, irrelevant things as noise in the images, or small differences in position of leaves etc. between the images, are not considered when calculating the distance measure.

By the term "image block" should, in the context of present specification, be understood a block of a corresponding size to the DCT block which is currently looked at, e.g. for which a differences to the image corresponding to the parent of the node. The image block may be in the pixel domain or in the DCT domain.

By building such tree data structure, where the images are ordered based on the distances (or differences) between the images, the root node of the tree structure will be the most general image and the rest of the images can then be advantageously compressed based on this root node image.

Since the tree data structure is ordered as described above, it is likely that image patches (i.e. DCT blocks) in a JPEG encoded image are similar to image patches in the JPEG encoded image of the parent in the tree data structure. Consequently, it is likely that, for at least some blocks in the JPEG encoded image, it requires less memory for storing the difference between the DCT blocks than storing the actual content of the DCT block.

Consequently, the compression performed by using a DCT encoded difference for representing image content instead of the originally encoded DCT block is similarity based, not time based (as video encoding algorithms). This makes it possible to compress images that are similar (such as sitting in front of the computer) but taken at completely different occasions.

According to a second aspect, the present invention is realized by a method for storing a plurality of JPEG encoded images in tree data structures in a computer memory, comprising the steps of: for each JPEG encoded image, calculating one or more feature vectors, each representing the content of the JPEG encoded image, using the calculated one or more feature vectors for each JPEG encoded image for calculating distance measures between each JPEG encoded image of the plurality of JPEG encoded images, clustering the plurality of JPEG encoded images into one or more clusters of images based on the calculated distance measures, wherein each cluster comprises one or more images.

From these clusters, tree data structures are created by: for each cluster comprising only one JPEG encoded image, creating a new tree data structure comprising only a root node, wherein the JPEG encoded image corresponds to the root node, for each cluster comprising a plurality of JPEG encoded images, ordering the plurality of JPEG encoded images in a tree data structure based on the calculated distance measures, wherein each JPEG encoded image of the plurality of JPEG encoded images corresponds to a node in the tree data structure, and wherein one JPEG encoded image of the plurality of JPEG encoded images corresponds to a root node in the tree data structure.

The method further comprises, for each node in the tree data structure not being the root node, encoding the corresponding JPEG encoded image by, for at least some of the DCT blocks in the JPEG encoded image, calculating DCT encoded differences to at least one image block in the JPEG encoded image corresponding to the parent of the node, and if at least one DCT encoded difference is less than a threshold difference, replacing the DCT block by data relating to the minimum DCT encoded difference among the DCT encoded differences.

By this method, tree data structures are created, wherein each comprising similar images. The clustering may be adapted such that the distance measures between the images within a tree data structure are small or large, meaning that images within a tree data structure may be more or less similar.

Using the same calculated distance measures for clustering as for ordering each tree data structure advantageously reduces the computational complexity for performing the method.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

BRIEF DESCRIPTION OF DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EXAMPLE EMBODIMENTS

Figure 1:
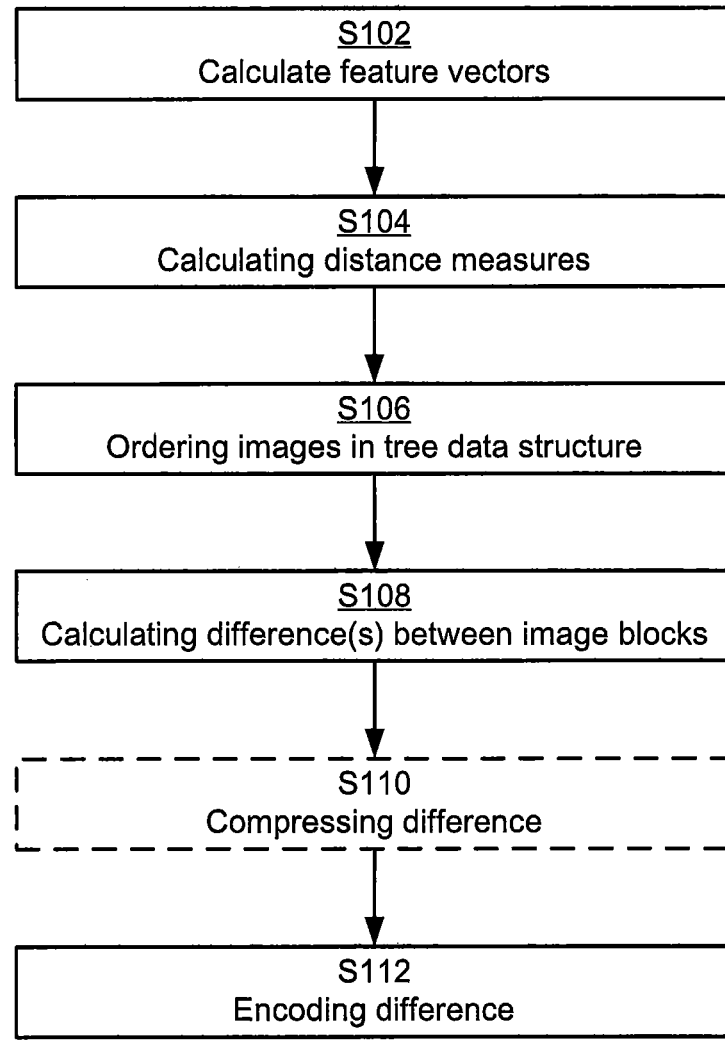
FIG. 1 describe by way of example a method for storing a plurality of JPEG encoded images in a tree data structure according to a first embodiment, FIG. 2 describe by way of example a method for storing a plurality of JPEG encoded images in a tree data structure according to a second embodiment, FIG. 3 describe a flow diagram for encoding differences between two JPEG encoded images, FIG. 4 describe a calculation of a DCT encoded difference according to a first embodiment, FIG. 5 describe a calculation of a DCT encoded difference according to a second embodiment, FIG. 6 show an example of a tree data structure, FIG. 7 describe deletion of nodes in the tree data structure shown in FIG. 6, FIG. 8 describe rebalancing the tree data structure shown in FIG. 7.

FIG. 1 describe how a plurality of JPEG encoded images can be ordered in a tree data structure and how the images corresponding to layers in the tree data structure below the root node can be advantageously stored by calculating and encoding differences between an image and its parent in the tree data structure. As described above, many images taken by a digital camera, for example a life-logging camera, have similar content. Images may share a lot of similarities, for example if taken at The same time the same day. This may result in very similar images.

The same time, same position, but different day (Common life-logging scenario). This may result in quite similar images.

Different time, different position, same day (Photographic tour). This may result in somewhat similar images (e.g. sky, conference rooms at workplace).

Different time, different day, but same position. This may result in somewhat similar images, especially indoors.

Even if the complete images are not entirely similar, there are often sub-patches from the images that may be nearly identical to a previously taken image.

These similarities may be taken advantages of when storing the images, e.g. for compressing reasons. For the scenario described in FIG. 1, it is assumed that a plurality of JPEG encoded images which are "similar enough" to be considered compressible have been identified.

Firstly, the method comprises: for each JPEG encoded image, calculating S102 one or more feature vectors, each representing the content of the JPEG encoded image.

The one or more feature vectors should be calculated using the same algorithm for all of the plurality of JPEG encoded images. There are many suitable available algorithms. According to some embodiments, only a global feature vector is calculated for each image. This means that this global feature vectors represent the entire content of the image for which it is calculated, such as the color histogram of the image. In this case, the color histogram may be calculated on a down sampled version of the image, or the color histogram may be clustered.

Further examples of a global feature vector are a vector describing a mini-thumbnail of the image, e.g. down to 64*64 pixels large, or a histogram of pixel values, e.g. clustered into 64, 128 or 256 discrete groups.

According to some embodiments, the image is divided into a grid of e.g. 5×4 blocks and a color histogram is calculated for each block. Then the color histograms (with optionally clustered values) are concatenated into one feature vector. This has the advantage that in case two images are similar in subparts of the images, such similarity may be found using this approach.

If only such global feature vector is used for representing the content of the image, the next step in the method, calculating S104 distance measures between each JPEG encoded image of the plurality of JPEG encoded images, may comprise calculating a Euclidian distance between each global feature vector and using this distance as a distance measure. According to other embodiments, when calculating the distance measure between two images, an earth mover's distance (EMD) algorithm may be used. For example, each of the two images can be divided into a few big areas (e.g. 2×2 blocks, 3×2 blocks etc.), and then the color histogram similarity between the blocks can be calculated by using the EMD algorithm. This method is not very sensitive to variations in color shifts nor is it sensitive to noise.

According to other embodiments, the first step S102 in the method of FIG. 1 comprises, for each JPEG encoded image, calculating a plurality of feature vectors, each representing the content of the JPEG encoded image. When a plurality of feature vectors are calculated S104 for each image, each may represent a sub-area in the image, e.g. local feature vectors. Each sub-area corresponds to an area in the image in which a point of interest is present, e.g. an edge, and from this point of interest, a gradient may be calculated and used as a feature vector. Such plurality of feature vectors may be calculated using any suitable feature detection algorithm, e.g. by using one ore more from the list of: a Scale-invariant feature transform (SIFT) algorithm, a Speeded Up Robust Features (SURF) algorithm, a Features From Accelerated Segment Test (FAST) algorithm and a Binary Robust Independent Elementary Features (BRIEF) algorithm. Further, the plurality of feature vectors for a JPEG encoded image may comprise a mix between such local feature vectors and global feature vectors.

When calculating a plurality of feature vectors for each image, each feature vector may be weighted differently. For example, a global feature vector may have the weight of ⅓, while the local feature vectors may have the weight of ⅔. The distance measures between the local feature vectors of two images may be calculated by any suitable method, e.g. using a SIFT matching algorithm implemented in Matlab or the Euclidian distance. In summary, an Euclidian distance may be calculated between all feature vectors of the first image or cluster with all feature vectors of the second image and cluster, and then all distances that are to large (above a threshold value) will be disregarded when calculating the final distance measure between the two images. A further option is to use the generic framework named ADABOOST for calculating the distance between two images if several different types of local feature vectors are calculated for each image. The dimensionality of each of the above discussed feature vectors depends on the algorithm and can be further chosen when implementing the method. A feature vector calculated using SIFT may typically comprise 128 dimension, but feature vectors calculated by other algorithms may have more or less dimensions.

It should be noted that the one or more feature vectors can be calculated based on the JPEG encoded image as is, or based on an interpolated version of the JPEG encoded image. For example, the interpolated version of the JPEG encoded image can be based on the thumbnail that is automatically created by the JPEG encoding algorithm when encoding the JPEG encoded images. Using interpolated versions of the JPEG encoded images for calculating the one or more feature vectors have several advantages. Firstly, it requires less computational calculations. Secondly, uninteresting features, e.g. noise, in the images may be removed when performing the interpolation.

For example, as the color histogram does not change very much when the resolution is increased or decreased, the global feature vector for a JPEG image could be calculated using a JPEG thumbnail instead of the full JPEG image.

The next step is to order S106 the plurality of JPEG encoded images in a tree data structure based on the calculated distance measures. This means that each JPEG encoded image of the plurality of JPEG encoded images corresponds to a node in the tree data structure, and that one JPEG encoded image of the plurality of JPEG encoded images corresponds to a root node in the tree data structure. In other words, the image that has the shortest distance to all the others will be chosen as the "root". The remaining images will be ordered according to the distance measures to the root and to each other. Such ordering is well known and left to the skilled person to implement.

The next step in the method described in FIG. 1 is to check if DCT blocks in an image of a node (not being the root node) can be encoded using the difference between the DCT block and a DCT block in the image of the parent of the node. In order to better explain this step, the main steps of a JPEG transform or encoding are briefly explained below.

The JPEG transform consists of a pipeline of algorithms. The main steps are:

1. Color Transform. Convert RGB to YUV, where luminance us kept in the Y channel and the chromatic information is kept in the U and V channels.

2. Down sampling. As the human eye is more sensitive to contrast than color variations, the Y channel is kept as-is, but the chrome channels are down sampled into blocks of 2×1 or 2×2.

3. Forward DCT. The Discrete Cosine Transform converts an 8×8 block of pixels into frequency components. The resulting block will have a few high values (low frequency components) and many low values (high frequency components).

4. Quantization. As the eye is not very sensitive to high frequency changes at low/detailed scale, a quantization table is used for grouping coefficient to different values. The quantization itself is simply $$\left\lfloor \frac{DCT\_val}{Q\_cal} \right\rfloor.$$

For example, given a DCT_val (the value of the DCT coefficients, e.g. when the DCT is calculated on a 8×8 pixel block) of 100 and a Q_val of 35, the result would be $$\left\lfloor \frac{100}{35} \right\rfloor = 2.$$

Higher coefficients (Q_val) mean fewer levels which equals lower entropy and better compression. It should be noted that a JPEG encoder usually only have one quantization table (8×8 values) per channel, and the same three tables are usually used for all images to be encoded. There exist cameras that try to optimize these quantization tables depending on the image content. This may give better image quality and/or better compression.

5. Encoding. After quantization the block will contain much fewer levels in the coefficients. This can be compressed with an entropy coder such as Huffman.

DCT blocks that are visually similar will have similar DCT coefficients as the frequency components are nearly the same. Consequently, replacing a DCT block by data relating to a DCT encoded difference to a DCT block in the image of the parent may be a good idea for achieving a higher compression. In other words, the next steps in the method described in FIG. 1 comprises for each node in the tree data structure not being the root node, encoding S112 the corresponding JPEG encoded image by, for at least some of the DCT blocks in the JPEG encoded image, calculating S108 DCT encoded differences to at least one image block in the JPEG encoded image corresponding to the parent of the node, and if at least one DCT encoded difference is less than a threshold difference, replacing the DCT block by data relating to the minimum DCT encoded difference among the DCT encoded differences. This means that if a suitable image block is found in the parent image (e.g. in the pixel domain or in the DCT domain), such that the difference between a currently checked DCT block in the image to be encoded and the image block is found in the parent image is less than a threshold difference, the difference may be used when encoding the portion of the image which is represented by the currently checked DCT encoded block.

Figure 5:
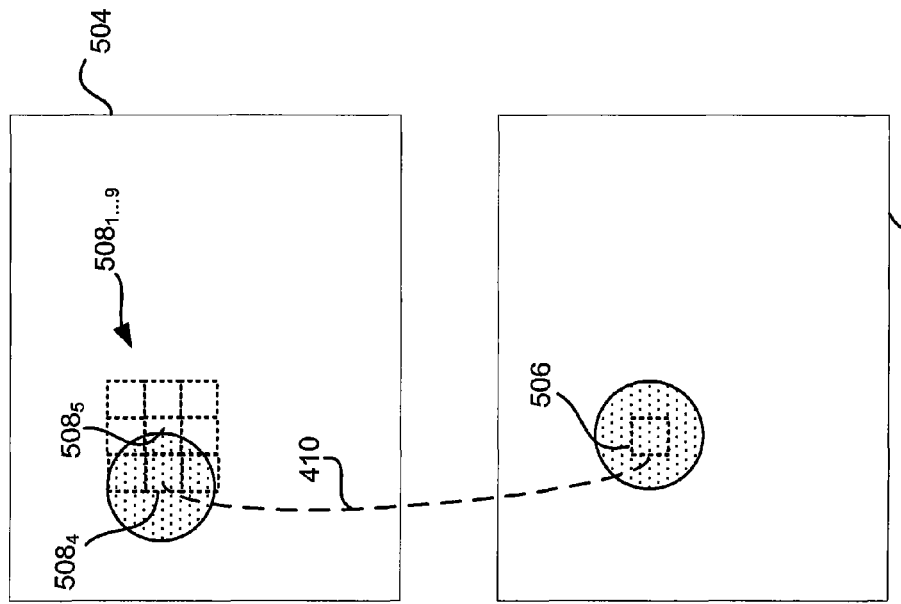

In order to find a suitable image block in the parent image, several approaches may be taken. In FIGS. 4 and 5, the search for suitable image blocks in the parent is conducted in the DCT domain. However, it should be noted that such a search also can be conducted in the pixel domain, as will be explained below in conjunction with FIG. 3. One approach for finding a suitable DCT block is shown in FIG. 4. In FIG.

4, an image 402 and an image 404 are shown. The upper image 404 corresponds to the parent of the node of the lower image 402. In FIG. 4, it is determined if a DCT block 406 in the lower image could be replaced by a DCT encoded difference. According to the embodiment in FIG. 4, only one DCT encoded difference to a DCT block is calculated. This is done by calculating a difference to a DCT block 408 at a corresponding position in the JPEG encoded image 404. By using this strategy, any image content that have not moved between two images, or large areas of similar content (e.g. the sky) which has moved, may be found at the same position in both images. In FIG. 4, the difference between the DCT block 406 in image 402 and the DCT block 408 at the corresponding position in the parent image is low. in other words, a comparison 410 between the two blocks 406, 408 will result in a small difference, which is less than the threshold difference. The DCT block 406 will thus be replaced by data relating to the minimum DCT encoded difference among the DCT encoded differences.

For the second set of DCT blocks 412, 414 in FIG. 4, the comparison 416 result in that the DCT encoded difference is above the threshold difference. Consequently, the DCT block 412 will be kept as is.

FIG. 5 shows a second approach for finding a suitable DCT block in the parent image 504 wherein not only the DCT block at the corresponding position in the parent node is the possible alternative.

In a 20 MP image there are 2000000/8*8=312500 blocks per channel. Matching blocks are unlikely to be found a long distance between the image areas, so the search can be localized to a smaller area. For example, the search area can be reduced to an image area of 2 MP around the DCT block at the corresponding position in the parent node. However, this means that 32768 DCT blocks are the possible candidate for finding a suitable DCT block in the parent image. Computing the best match among so many blocks may be a computationally complex procedure, and much smaller areas can be used when processing resources are scarce.

In FIG. 5, nine DCT encoded differences are calculated between the DCT block 506 in the image 502 and nine DCT blocks $508_{1 \ldots 9}$ in the parent image 504. In other words, the step S108 (FIG. 1) of calculating DCT encoded differences to at least one DCT block in the JPEG encoded image 504 corresponding to the parent of the node comprises calculating a plurality of DCT encoded differences to DCT blocks $508_{1 \ldots 9}$ within a threshold distance from the DCT block $508_5$ at a corresponding position in the JPEG encoded image 504 corresponding to the parent of the node.

In the example of FIG. 5, a best match are found in DCT block $508_4$ since the object in the FIGS. 502, 504 has moved a bit between the images.

Consequently, the DCT block 506 is replaced by data relating to the minimum DCT encoded difference (i.e. between DCT block 506 and DCT block $508_5$) among the DCT encoded differences (between DCT block 506 and all of the DCT blocks $508_{1 \ldots 9}$).

If the second approach is employed, the data relating to the minimum DCT encoded difference among the DCT encoded differences further comprises a reference to which DCT block in the JPEG encoded image corresponding to the parent the minimum DCT encoded difference relate.

For example, the first bit in the data may tell if there will follow a reference or not.

Bit 0: Is there a reference? 0=No, 1=yes.
    If the bit is set to 0, the ordinary DCT block will follow directly without any special encoding.

Bit 1-$n$ ($n$ depending on the possible number of DCT blocks in the parent image that can be addressed). Reference to the block in the root node that is similar. E.g. $n=15$ gives 32768 different blocks that can be addressed.

Now returning to FIG. 1, the method may optionally comprise the step of compressing S110 the minimum DCT encoded difference using an entropy coder or a range coder, and wherein the data relating to the minimum DCT encoded difference corresponds to the compressed DCT encoded difference. Since the delta values, or differences, between the two DCT blocks likely will be small, they may be further compressible using e.g. Huffman coding.

If no further compression S110 of the DCT encoded difference is performed, lossless compression of the images not corresponding to the root node of the tree data structure is achieved. However, it is likely that the images at a lower level in such a tree will not be viewed as much as the image corresponding to the root node, since these images look like the image corresponding to the root node. Consequently, lossy compression may be acceptable.

Figure 3:
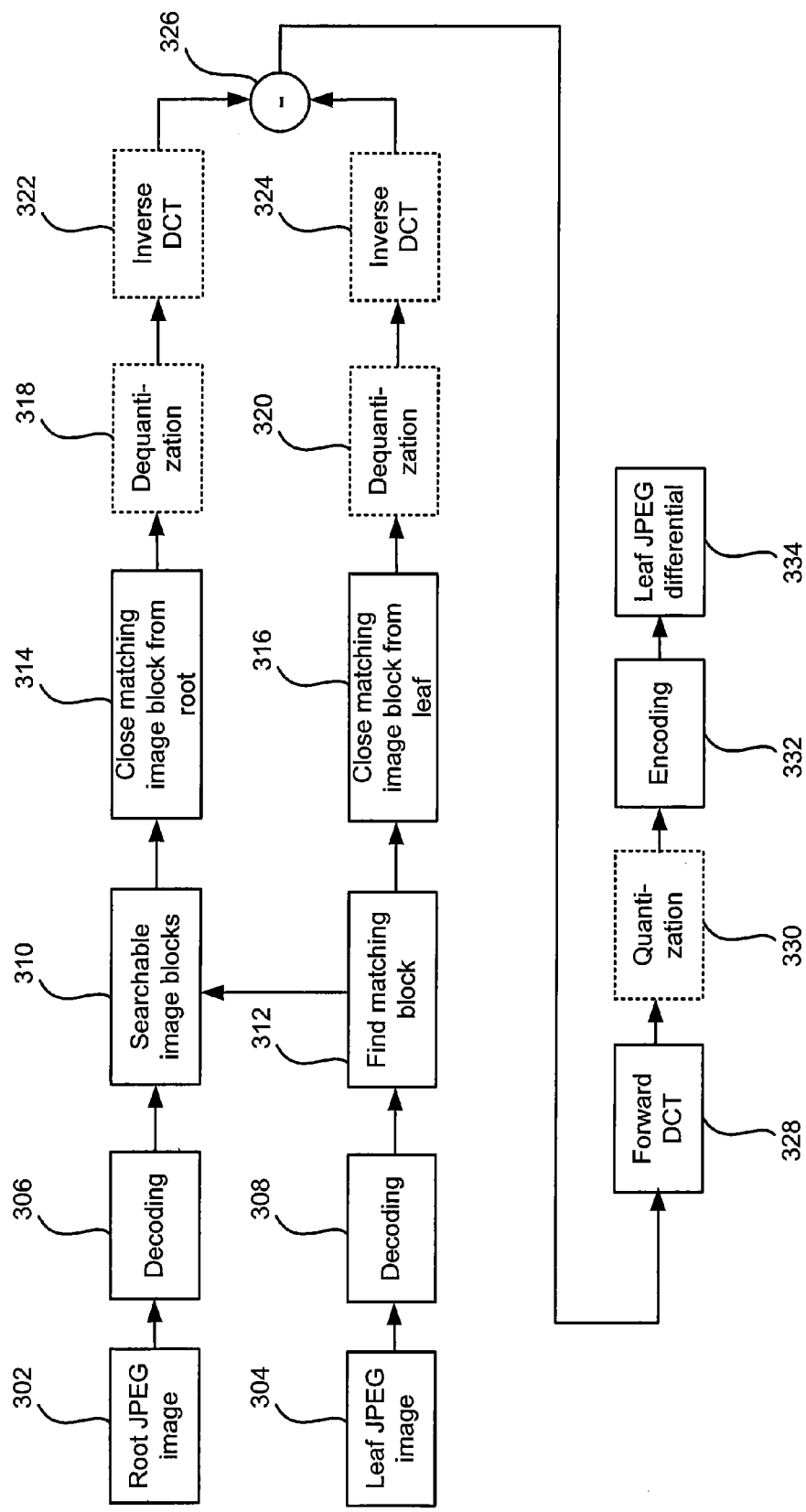
Figure 4:
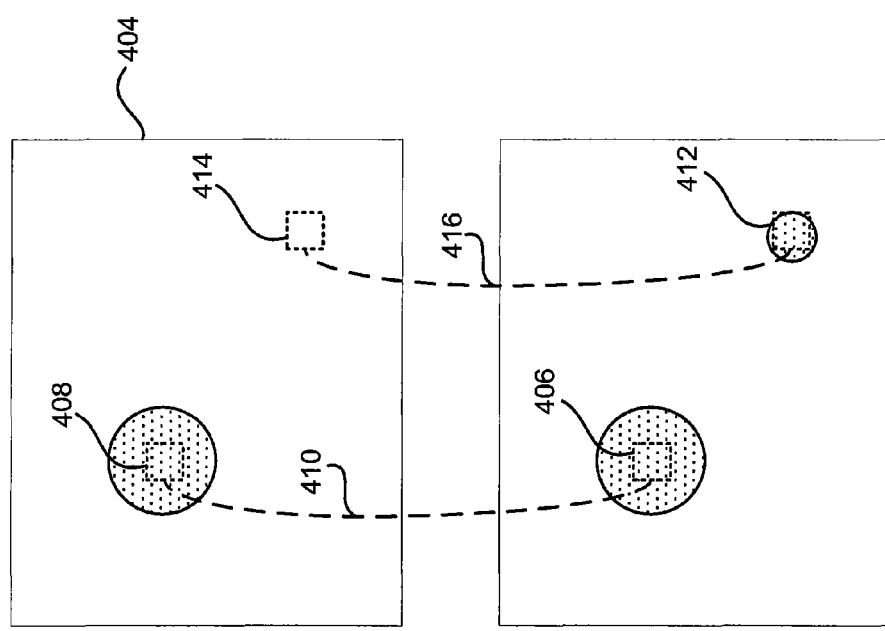

FIG. 3 shows by way of example a flow diagram for encoding differences between two JPEG encoded images, e.g. a root JPEG encoded image 302 and a leaf JPEG encoded image 304. Since the DCT block coefficients often are compressed in the JPEG images 302, 304, first, the compressed DCT blocks in the two images 302, 304 needs to be decoded 306, 308 such that the DCT coefficients can be read in plain text. When this is done, the root JPEG encoded image 302 comprises searchable image blocks 310 which can be used for finding a matching block for DCT blocks 312 in the leaf JPEG encoded image 304. After such a search, two close matching image blocks 314, 316 may be found, one image block 316 from the leaf JPEG encoded image 304 and one image block 314 from the root JPEG encoded image 302. If the search was performed in the DCT domain (see below), these blocks are dequantized 318, 320 and pixel values for the image areas corresponding to the matching DCT blocks 314, 316 are retrieved by performing an inverse DCT 322. Then a difference between the two image areas is calculated by subtracting 326 the pixel values from each other. The resulting difference is transformed back to the frequency domain by performing a Forward DCT 328. The DCT coefficients are optionally quantized 330 again (as described in conjunction with step S110 in FIG. 1). A final encoding 332 of the DCT encoded difference (using e.g. a Huffman coder or a range-coder) is performed before replacing the originally DCT encoded block in the leaf JPEG encoded image with the DCT encoded difference 332.

It should be noted that the searchable image blocks 310 may be blocks of 8×8 pixels in the pixel domain. It that case the method comprises an extra step of decoding the root JPEG image 302 into the pixel domain prior to the step of finding a matching block for DCT blocks 312 in the leaf JPEG encoded image 304. In that case, the DCT block in the leaf JPEG image 304 also needs to be decoded into the pixel domain prior to finding a matching block for DCT blocks 312 in the leaf JPEG encoded image 304. When searching for matching blocks in the pixel domain, the candidate image blocks for matching is not bound to e.g. 8 pixel boundaries (the size of a DCT-block according to some embodiments), instead the pixel based approach can be per-pixel basis, or even sub-pixel basis if image interpolation is used. For example, if an object has moved 3 pixels (or 2.5 pixels in the image interpolation scenario) to the right between the images, this can be advantageously handled in the pixel based approach. On the other hand, compression may actually increase where areas in the image has the same noise characteristics if using searching for matching blocks in the DCT-domain. A pixel based approach may be sensitive to noise, whereas the DCT puts low-frequency coefficients to the beginning of the vector, regardless of noise.

Figure 6:
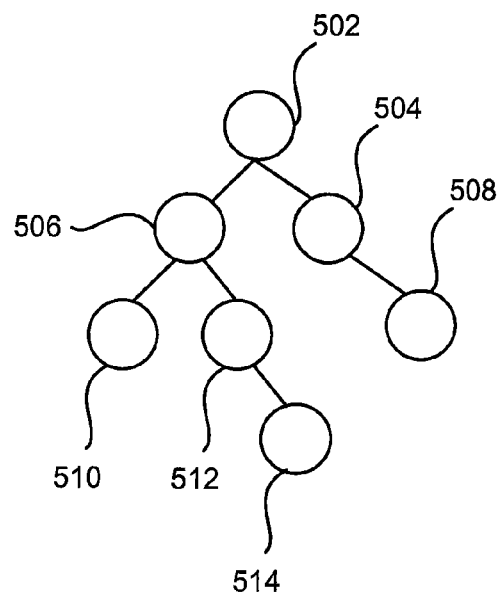

FIG. 6 show by way of example a tree data structure, comprising a root node 502 and a plurality of descendant nodes 506, 506, 508, 510, 512, 514. Employing such tree data structure is advantageous in that the differences between the images corresponding to the nodes in the tree data structure can be encoded in an efficient way, since the tree data structure is built using the difference measures between the images.

When an additional JPEG encoded image should be added to the tree data structure one or more additional feature vectors are calculated, using the same algorithm(s) as the one(s) used for the other images in the tree. Using these additional feature vectors, additional distance measures between the additional JPEG encoded image and each of the plurality of JPEG encoded images are calculated. Based on which JPEG encoded image of the plurality of JPEG encoded images that is closest to the additional JPEG encoded image, an additional node corresponding to the additional JPEG encoded image is added to the tree data structure. This additional JPEG encoded image is then and encodes as described above, i.e. by, for at least some of the DCT blocks in the additional JPEG encoded image, calculating DCT encoded differences to at least one DCT block in the JPEG encoded image corresponding to the parent of the additional node, and if at least one difference is less than a threshold difference, replacing the DCT block by data relating to the minimum DCT encoded difference among the DCT encoded differences. In case the additional JPEG encoded image is inserted in the tree data structure such that it will have children images, these images may need to be re-encoded.

Figures 7, 8:
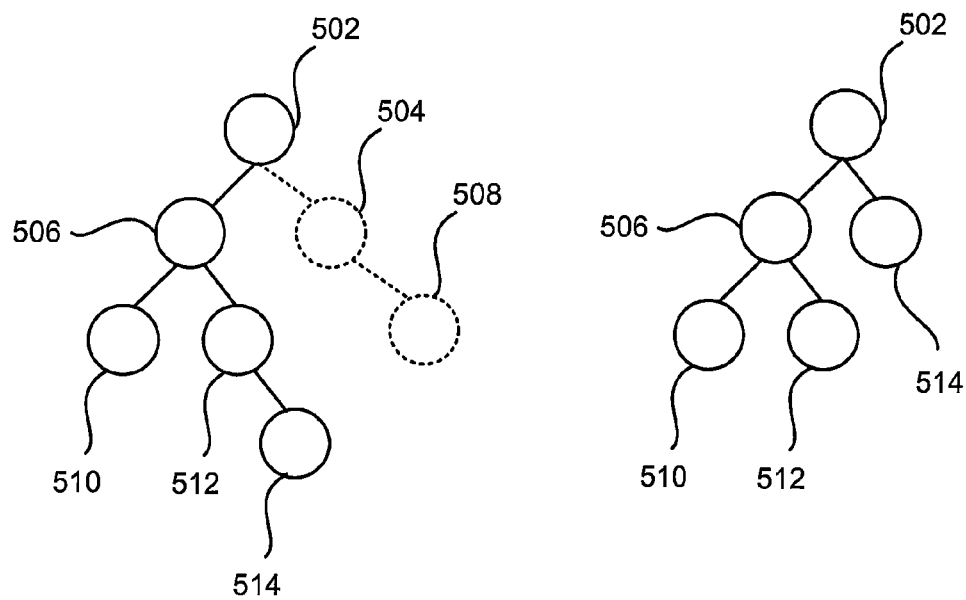

FIG. 7 describe the scenario when images in a tree data structure are deleted. FIG. 8 describe a rebalancing operation that may need to be performed after deletion (or addition) of images to the tree data structure.

In FIG. 7, nodes 504, 508 corresponding to two different images are deleted. First assume that node 504 is deleted first of the two nodes 504, 508.

Since the node 504 corresponding to the JPEG encoded image that is deleted is not a leaf node, two options exists. Either, the node 504 (and the image) is deleted permanently direct. In this case, before deletion, the image of its child node 508 needs to be re-encoded (as described in FIG. 3) using the image corresponding to node 502 as the image to which differences between DCT blocks should be calculated. This may be a costly operation. A second alternative is to just mark the node as deleted, which may mean that the corresponding image no longer is shown in a image browsing program, e.g. in a smartphone, laptop, tablet computer etc. comprising a computer-readable storage medium with instructions (e.g. an installed computer program product) adapted to carry out the methods described herein, using its processing capability. By only marking the node as deleted, the above described re-encoding of the image of the child node of the "deleted" node need not to occur. If the image corresponding to the node 508 later is deleted (as shown in FIG. 6), its parent node 504 can also be permanently deleted.

On the other hand, if the node 508 is deleted first of the two nodes 504, 508, this node can be permanently deleted since is a leaf node. If the node 504 subsequently is deleted, this node will also be a leaf node and can thus safely be permanently deleted.

When the two nodes 504, 508 are deleted, the tree data structure comprises only 5 nodes but still four levels. This may be good from a compression point of view, but not from a performance point of view since a lot of differences between DCT blocks needs to be taken into account if for example the JPEG encoded image corresponding to the node 514 is to be shown in an image browsing program (e.g. brought back to its originally JPEG encoded state, comprising no DCT encoded differences).

From this perspective, it may be advantageous to rebalancing the tree data structure. This can be done whenever the computer system is in low load, as the only effect of balancing is better performance and smaller file size, not any changes in functionality. If such rebalancing follows an addition of a JPEG encoded image to the tree data structure as described above, such rebalancing can be performed by using the calculated one or more feature vectors for each JPEG encoded image including the additional JPEG encoded image for calculating new distance measures between each of the JPEG encoded images including the additional JPEG encoded image, and ordering the plurality of JPEG encoded images including the additional JPEG encoded image in a tree data structure based on the calculated new distances measures. Some of the images may then need to be re-encoded since new parent images have been given to them. As understood from above, it may be advantageous to store all calculated one or more feature vectors for all images in the tree data structure in memory such that the can be easily accessed when a rebalancing operation, deletion operation and/or addition operation of images needs the be performed.

In FIG. 8, the tree data structure of FIG. 7 is rebalanced. Since only the node 514 got a new parent in the rebalanced tree data structure, only the image corresponding to the moved node 514 needs to be re-encoded.

Figure 2:
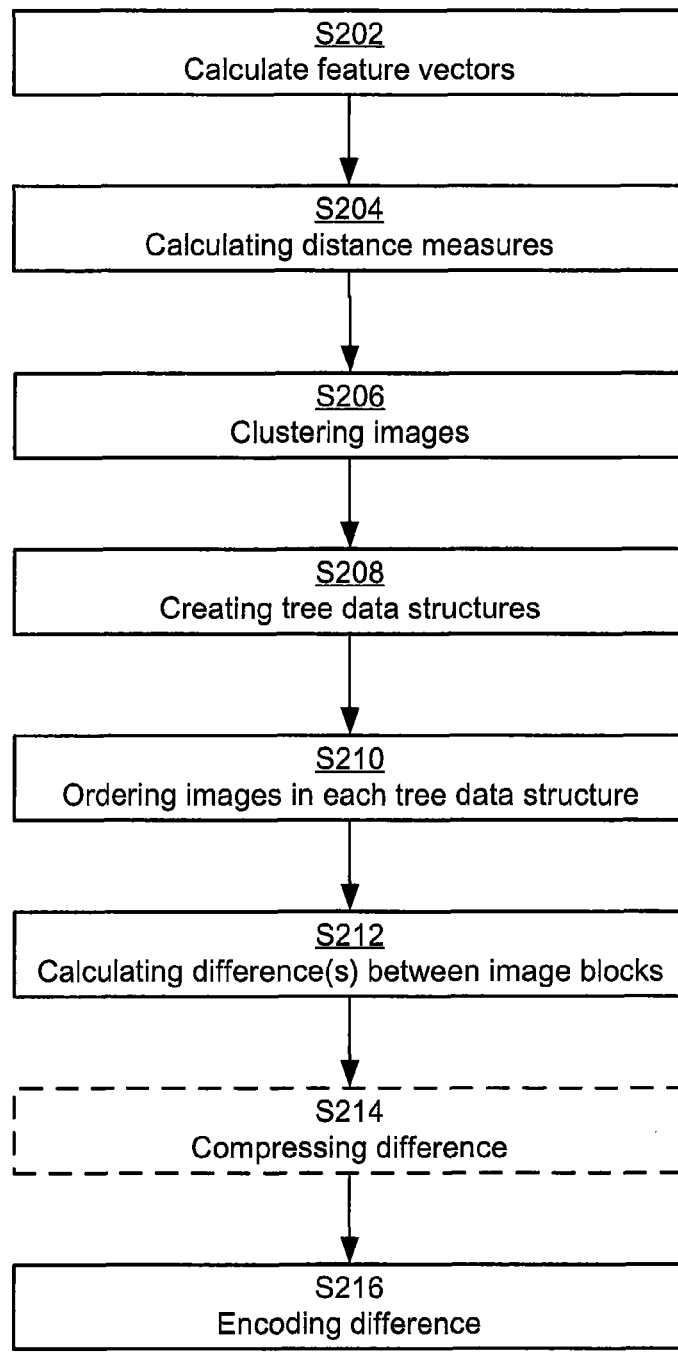

FIG. 2 shows a method for storing a plurality of JPEG encoded images in tree data structures in a computer memory. The difference between the method of FIG. 1 and the method of FIG. 2 it is not assumed that all of the plurality of JPEG encoded images to be stored using the method of FIG. 2 are "similar enough" to be considered compressible. Consequently, the plurality of images first need to be clustered into groups of images having such similarities. The first step comprises: for each JPEG encoded image, calculating S202 one or more feature vectors, each representing the content of the JPEG encoded image. These one or more feature vectors may be calculated as described above. The next step is to use the calculated one or more feature vectors for each JPEG encoded image for calculating S204 distance measures between each JPEG encoded image of the plurality of JPEG encoded images, also as described above.

The next step is new compared to the method of FIG. 1. The next step comprises clustering S206 the plurality of JPEG encoded images into one or more clusters of images based on the calculated distance measures, wherein each cluster comprises one Or more images. Any suitable clustering method may be used, e.g. using a hard threshold for the distance measure, using a nearest neighbor algorithm, using a Random sample consensus (RANSAC) algorithm etc.

Out of the one or more clusters, the same number of tree data structures is created S208.

For each cluster comprising only one JPEG encoded image, a new tree data structure comprising only a root node is created, wherein the JPEG encoded image corresponds to the root node. No further steps are done on this tree data structure until an additional JPEG encoded image is added to this single node tree data structure, as described above.

For each cluster comprising a plurality of JPEG encoded images, the steps described in conjunction to FIG. 1 are performed. To summarize these steps, firstly the plurality of JPEG encoded images is ordered S210 in a tree data structure based on the calculated distance measures, wherein each JPEG encoded image of the plurality of JPEG encoded images corresponds to a node in the tree data structure, and wherein one JPEG encoded image of the plurality of JPEG encoded images corresponds to a root node in the tree data structure. Secondly, for each node in the tree data structure not being the root node, the corresponding JPEG encoded image is encoded S216 by, for at least some of the DCT blocks in the JPEG encoded image, calculating S212 DCT encoded differences to at least one image block in the JPEG encoded image corresponding to the parent of the node, and if at least one DCT encoded difference is less than a threshold difference, replacing the DCT block by data relating to the minimum DCT encoded difference among the DCT encoded differences. Optionally, the minimum DCT encoded difference may be compressed S214, also as described above.

When adding a JPEG encoded image, for which one or more additional feature vectors are calculated, firstly it is determined if the additional JPEG encoded image should be added to an existing cluster, and if so, to which existing cluster the additional JPEG encoded image should be added. This can be done by using the additional feature vectors for calculating additional distance measures between the additional JPEG encoded image and each of the JPEG encoded images that corresponds to the root nodes in the already existing tree data structures, and if at least one additional distance measure is less than a threshold distance, adding the additional JPEG encoded image to the tree data structure corresponding to the minimum additional distance measures among the additional distance measures. If no distance measure is below the threshold distance, the additional JPEG encoded image will form a new tree data structure comprising only one node.

If the additional JPEG encoded image is to be added to an existing tree data structure, this is done as explained above. In summary by using the additional one or more feature vectors for calculating further distance measures between the additional JPEG encoded image and each JPEG encoded image corresponding to a node of the tree data structure, and, based on which JPEG encoded image corresponding to a node of the tree data structure that is closest to the additional JPEG encoded image, adding an additional node corresponding to the additional JPEG encoded image to the tree data structure and encoding the additional JPEG encoded image by for at least some of the DCT blocks in the additional JPEG encoded image, calculating a DCT encoded differences to at least one image block in the JPEG encoded image corresponding to the parent of the additional node, and if at least one DCT encoded difference is less than a threshold difference, replacing the DCT block by data relating to the minimum DCT encoded difference among the DCT encoded differences.

According to some embodiments, the additional JPEG encoded image first is added to a new tree data structure, or stored in an "ordinary" way in the device taking the image. The steps described above may then be performed later in time, e.g. when the computer system is in low load.

The person skilled in the art realizes that the present invention by no means is limited to the order of the steps in the exemplary embodiment of the method described above. Moreover, further variations are possible within the scope of the appended claims. For example, other algorithms then the above specified algorithms for calculating the one or more feature vectors may be employed. Such other algorithms comprise Blob detection or histogram of oriented gradients.

The invention claimed is:

1. A method for storing a plurality of JPEG encoded images in a tree data structure, comprising the steps of:

for each JPEG encoded image, calculating one or more feature vectors, each representing the content of the JPEG encoded image, using the calculated one or more feature vectors for each JPEG encoded image for calculating distance measures between each JPEG encoded image of the plurality of JPEG encoded images, ordering the plurality of JPEG encoded images in a tree data structure based on the calculated distance measures, wherein each JPEG encoded image of the plurality of JPEG encoded images corresponds to a node in the tree data structure, and wherein one JPEG encoded image of the plurality of JPEG encoded images corresponds to a root node in the tree data structure, for each node in the tree data structure not being the root node, encoding the corresponding JPEG encoded image by, for at least some of the DCT blocks in the JPEG encoded image, calculating DCT encoded differences to at least one image block in the JPEG encoded image corresponding to the parent of the node, and if at least one DCT encoded difference is less than a threshold difference, replacing the DCT block by data relating to the minimum DCT encoded difference among the DCT encoded differences.

2. The method according to claim 1, further comprising the step of compressing the minimum DCT encoded difference using an entropy coder or a range coder, and wherein the data relating to the minimum DCT encoded difference corresponds to the compressed DCT encoded difference.

3. The method according to claim 1, wherein the feature vectors are calculated based on interpolated versions of the plurality of JPEG encoded images.

4. The method according to claim 3, wherein the interpolated versions of the plurality of JPEG encoded images are based on thumbnails created when encoding the JPEG encoded images.

5. The method according to claim 1, wherein the step of calculating distance measures between each JPEG encoded image of the plurality of JPEG encoded images comprises using an earth mover's distance, EMD, algorithm.

6. The method according to claim 1, further comprising the step of:

adding an additional JPEG encoded image to the tree data structure by:

based on the additional JPEG encoded image, calculating one or more additional feature vectors, using the additional feature vectors for calculating additional distance measures between the additional JPEG encoded image and each of the plurality of JPEG encoded images, and, based on which JPEG encoded image of the plurality of JPEG encoded images that is closest to the additional JPEG encoded image, adding an additional node corresponding to the additional JPEG encoded image to the tree data structure and encoding the additional JPEG encoded image by, for at least some of the DCT blocks in the additional JPEG encoded image, calculating DCT encoded differences to at least one image block in the JPEG encoded image corresponding to the parent of the additional node, and if at least one difference is less than a threshold difference, replacing the DCT block by data relating to the minimum DCT encoded difference among the DCT encoded differences.

7. The method according to claim 6, further comprising the step of:

rebalancing the tree data structure by:
using the calculated one or more feature vectors for each JPEG encoded image including the additional JPEG encoded image for calculating new distance measures between each of the JPEG encoded images including the additional JPEG encoded image, and ordering the plurality of JPEG encoded images including the additional JPEG encoded image in a tree data structure based on the calculated new distances measures.

8. The method according to claim 1, further comprising the step of:
deleting a JPEG encoded image by:
if the corresponding node is a leaf node, deleting the node permanently from the tree data structure, and
if the corresponding node is not a leaf node, only mark the node as deleted.

9. The method according to claim 1, wherein the step of calculating DCT encoded differences to at least one DCT block in the JPEG encoded image corresponding to the parent of the node comprises only calculating one DCT encoded difference to the DCT block at a corresponding position in the JPEG encoded image corresponding to the parent of the node.

10. The method according to claim 1, wherein the step of calculating DCT encoded differences to at least one DCT block in the JPEG encoded image corresponding to the parent of the node comprises calculating a plurality of DCT encoded differences to DCT blocks within a threshold distance from the DCT block at a corresponding position in the JPEG encoded image corresponding to the parent of the node, and wherein the data relating to the minimum DCT encoded difference among the DCT encoded differences further comprises a reference to which DCT block in the JPEG encoded image corresponding to the parent the minimum DCT encoded difference relate.

11. A computer program product comprising a non-transitory computer-readable storage medium storing instructions adapted to carry out the method of claim 1 when executed by an instruction processing device.

12. A method for storing a plurality of JPEG encoded images in tree data structures in a computer memory, comprising the steps of:
for each JPEG encoded image, calculating one or more feature vectors, each representing the content of the JPEG encoded image,
using the calculated one or more feature vectors for each JPEG encoded image for calculating distance measures between each JPEG encoded image of the plurality of JPEG encoded images,
clustering the plurality of JPEG encoded images into one or more clusters of images based on the calculated distance measures, wherein each cluster comprises one or more images,
creating tree data structures by:
for each cluster comprising only one JPEG encoded image, creating a new tree data structure comprising only a root node, wherein the JPEG encoded image corresponds to the root node,
for each cluster comprising a plurality of JPEG encoded images, ordering the plurality of JPEG encoded images in a tree data structure based on the calculated distance measures, wherein each JPEG encoded image of the plurality of JPEG encoded images corresponds to a node in the tree data structure, and wherein one JPEG encoded image of the plurality of JPEG encoded images corresponds to a root node in the tree data structure, and for each node in the tree data structure not being the root node,
encoding the corresponding JPEG encoded image by, for at least some of the DCT blocks in the JPEG encoded image, calculating DCT encoded differences to at least one image block in the JPEG encoded image corresponding to the parent of the node, and if at least one DCT encoded difference is less than a threshold difference, replacing the DCT block by data relating to the minimum DCT encoded difference among the DCT encoded differences.

13. The method according to claim 12, further comprises the step of adding an additional JPEG encoded image by:
based on the additional JPEG encoded image, calculating one or more additional feature vectors,
using the additional feature vectors for calculating additional distance measures between the additional JPEG encoded image and each of the JPEG encoded images that corresponds to the root nodes in the tree data structures, and if at least one additional distance measure is less than a threshold distance, adding the additional JPEG encoded image to the tree data structure corresponding to the minimum additional distance measures among the additional distance measures by:
using the additional one or more feature vectors for calculating further distance measures between the additional JPEG encoded image and each JPEG encoded image corresponding to a node of the tree data structure, and, based on which JPEG encoded image corresponding to a node of the tree data structure that is closest to the additional JPEG encoded image, adding an additional node corresponding to the additional JPEG encoded image to the tree data structure and encoding the additional JPEG encoded image by for at least some of the DCT blocks in the additional JPEG encoded image, calculating DCT encoded differences to at least one image block in the JPEG encoded image corresponding to the parent of the additional node, and if at least one DCT encoded difference is less than a threshold difference, replacing the DCT block by data relating to the minimum DCT encoded difference among the DCT encoded differences.

14. The method of claim 13, wherein the additional JPEG encoded image first is added to a new tree data structure, and wherein the steps of claim 13 are performed later in time.

15. A computer program product comprising a non-transitory computer-readable storage medium storing instructions adapted to carry out the method of claim 12 when executed by an instruction processing device.

* * * * *